J. WILLIAMS.
ENGINE FOR THE PROPULSION OF VESSELS.
APPLICATION FILED JUNE 30, 1914.
1,167,139.
Patented Jan. 4, 1916.
Fig. 1.
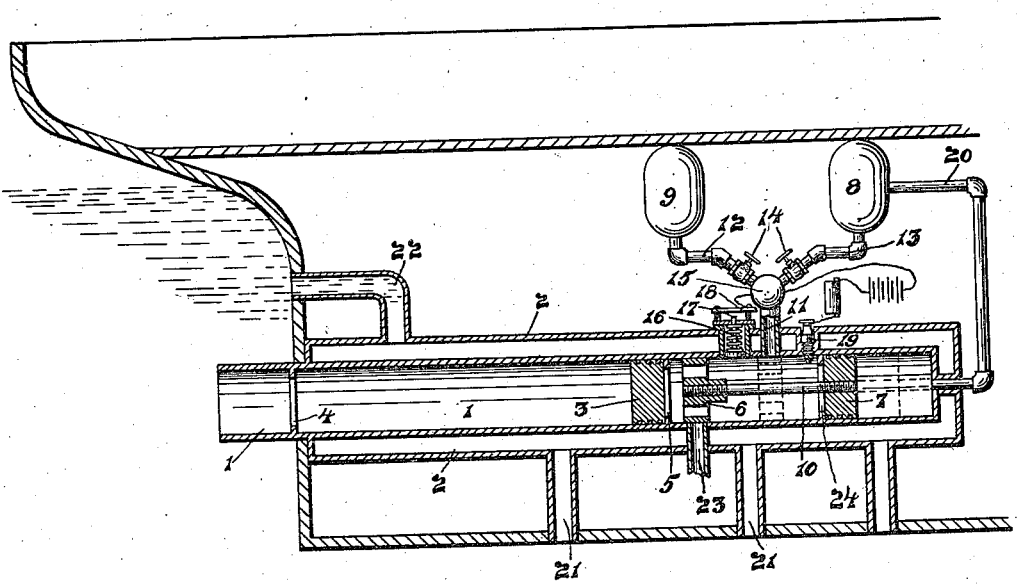
Fig. 2.
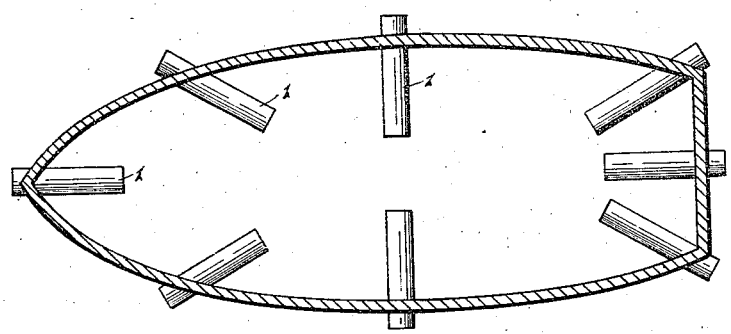
Fig. 3.
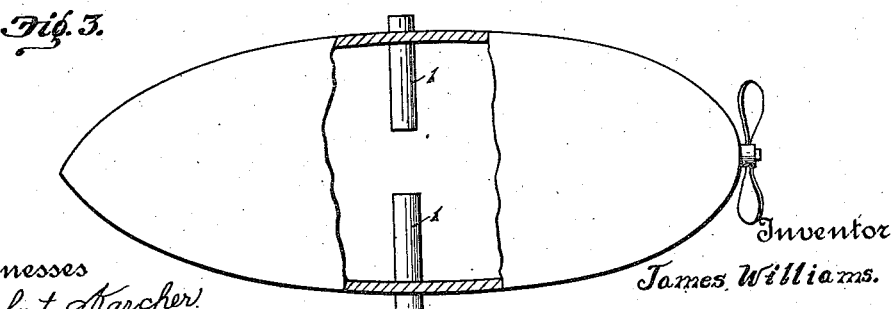
Fig. 4.
Witnesses
Robert Karcher
Sylvia Boron
Inventor
James Williams.
By H. W. Bond Attorney.

UNITED STATES PATENT OFFICE.

JAMES WILLIAMS, OF CANFIELD, OHIO.

ENGINE FOR THE PROPULSION OF VESSELS.

1,167,139.  Specification of Letters Patent.  Patented Jan. 4, 1916.

Application filed June 30, 1914. Serial No. 848,256.

*To all whom it may concern:*

Be it known that I, JAMES WILLIAMS, a citizen of the United States, residing at Canfield, in the county of Mahoning and State of Ohio, have invented certain new and useful Improvements in Engines for the Propulsion of Vessels, of which the following is a specification.

My invention relates to engines for the propulsion of vessels in which one or more cylinders or tubes are employed, which cylinders are open ended and are designed to be kept cool by water jackets common to gasolene or fuel engines.

The objects of my invention are, first, to provide means whereby vessels can be propelled by an explosive engine or engines, second, to provide means for directing the movement of the vessel, and third, to provide an economical engine or engines of simple construction. These objects, together with other objects readily apparent to those skilled in the art I attain by the construction illustrated in the accompanying drawing, although my invention may be embodied in a variety of other mechanical forms, the construction illustrated being chosen by way of example.

In the accompanying drawing: Figure 1 is a vertical longitudinal section of an engine embodying my improvement and a portion of the vessel containing such engine and the parts belonging thereto. Fig. 2 is a horizontal section of a vessel showing a number of engine cylinders arranged at various angles. Fig. 3 is a side elevation of a submarine vessel showing parts broken away. Fig. 4 is a detached view of the open piston.

Similar numerals of reference indicate corresponding parts in all the figures of the drawing.

In the accompanying drawing 1 represents a cylinder or tube which is located in the bottom portion of the vessel and is surrounded by the water jacket 2. The cylinder 1 is open at its outer end and is to be located below the water line of the vessel. Within the cylinder 1 is located the piston 3 which piston is slidably mounted in the cylinder and the outer face of the piston is in contact with the water contained in the cylinder, said water entering the open end of the cylinder. The movements of the piston 3 are limited by suitable flanges 4 and 5 which flanges are fixed in spaced relationship with reference to each other in the cylinder 1 in any convenient and well known manner. Within the cylinder 1 are located the hollow or open piston 6 and the solid piston 7, said pistons being connected together by means of the rod 10.

For the purpose of supplying a mixture of air and gas to the cylinder 1 the air tank 8 is provided and a gas tank 9, said tanks being of any well known construction and the usual means (not shown) for filling the gas tank 9 is also provided. Compressed air is also supplied to the air tank 8 by any well known means; but owing to the fact that the method or operation of compressing the air does not enter into the present invention such device is not illustrated.

The proper amount of air and gas is conveyed to the cylinder 1 by means of the supply pipe 11 and pipes 12 and 13 which pipes communicate with the air and gas tanks 8 and 9. For the purpose of regulating the amount of gas and air, suitable valves 14 are provided, which valves are of the usual construction and for the purpose of preventing back pressure an ordinary check valve 15 is provided, which check valve may be of any well known construction such as is upon the market and no detailed construction is necessary, as such check valve does not enter into the present invention except that a check valve of some construction must necessarily be present.

The operation of the engine is as follows: After a certain amount of air and gas passes into the cylinder 1 between the pistons 6 and 7, or more specifically between the pistons 3 and 7 a sufficient amount of pressure will be produced to overcome the spring 16, thereby moving the contact plug or point 17 upward and in contact with the plate 18, thereby closing the circuit and causing an explosion by means of the usual spark plug 19. The devices for producing a spark may be of the construction shown, but the arrangement may be varied as the only purpose so far as the present invention is concerned is to provide means for causing an explosion of the air and gas by the sparking of the plug 19. After the engine has been put in motion the various explosions will act upon the spring or the pressure will lift the spring, thereby causing the sparking of the plug for the next following explosion. When an explosion takes place the force of the explosion will be exerted against the sliding piston 3 and the solid piston 7, moving the piston 3 toward the stop flange 4, said piston 3 acting against the water contained in the cylinder, which by reason of the back force exerted by the forward or sliding movement of the piston 3, will thereby move the vessel. For the purpose of providing exhaust the piston 6 moves backward with the piston 7, thereby opening the exhaust pipe 23. For the purpose of moving the pistons 6 and 7 in the opposite direction from that given to them by the explosion a quantity of air is fed from the air tank 8 through the pipe 20, whereby an air pressure is exerted upon said piston.

In Fig. 2 I have illustrated a number of cylinders 1 arranged at different angles with reference to the vessel, but do not illustrate the mechanism pertaining to such cylinders, owing to the fact that it would be a duplication of the mechanism shown in Fig. 1 but in order to control the movements of the vessel the cylinders are located at different angles and the mechanism of the various cylinders brought into action to propel the vessel in the direction desired.

In Fig. 3 I have illustrated a submarine vessel showing the cylinders arranged for lowering and elevating the vessel. Two cylinders are shown but the number may be increased without departing from the nature of the present invention. For the purpose of allowing water to pass into the chamber formed by the water jacket 2 the bottom of the vessel is provided with suitable pipes 21 through which pipes water will pass and surround the cylinder 1. As the water becomes heated it will find its way against the cold water which enters the pipe 22 thereby allowing the escape of the heated water or the cooling down of the same by the mingling of the water entering the pipe 22. For the purpose of providing means for conveying the products of combustion the pipe 23 is provided, which pipe may lead to any part of the vessel, but preferably above the water line. For the purpose of limiting the movement of the spaced pistons 6 and 7, a flange 24 is provided, which flange is located between the spaced pistons and secured in any convenient and well known manner to the cylinder 1.

It will be understood that by bringing into action the propelling devices or throwing them out of action I am enabled to regulate the movements of the vessel or bring the same to a stop.

Having fully described my invention what I claim as new and desire to secure by Letters Patent, is:

1. In an engine for the propulsion of vessels, the combination of an open ended cylinder adapted to receive water, said cylinder provided with flanges spaced apart, a piston located between said spaced flanges and adapted for contact with the water contained in the cylinder, pistons located in alinement with the aforesaid sliding pistons, said pistons spaced apart from each other and connected together, one of said pistons provided with openings, a spark plug adapted to produce explosions intermediate the pistons located in alinement with the sliding pistons located in the spaced flanges in the cylinder.

2. In a device of the character described, the combination of a vessel, an open ended cylinder located in the lower portion of the vessel, a water jacket surrounding said cylinder and spaced therefrom, passages leading from the water contact surface of the vessel to the cylinder, and a water exhaust pipe leading from the water jacket, a sliding piston, means for limiting the movements of said sliding piston, spaced pistons located in alinement with said sliding piston, one of said spaced pistons open and the other solid, air and gas tanks, means for conveying air and gas to the cylinder between the spaced pistons and means for conveying air to the inner or closed end of the cylinder.

3. In a device of the character described, the combination of a vessel, an open ended cylinder located in the lower portion of the vessel, a water jacket surrounding said cylinder and spaced therefrom, passages leading from the water contact surface of the vessel to the cylinder, and a water exhaust pipe leading from the water jacket, a sliding piston, means for limiting the movements of said sliding piston, spaced pistons located in alinement with said sliding piston, one of said spaced pistons open and the other solid, air and gas tanks, means for conveying air and gas to the cylinder between the spaced pistons, means for conveying air to the inner or closed end of the cylinder, and means for producing an explosion between the sliding piston and the spaced piston.

In testimony that I claim the above, I have hereunto subscribed by name in the presence of two witnesses.

JAMES WILLIAMS.

Witnesses:
S. A. ARNOLD,
C. C. FOWLER.